(12) United States Patent
Sasaki

(10) Patent No.: US 6,654,189 B1
(45) Date of Patent: Nov. 25, 2003

(54) DIGITAL-SIGNAL PROCESSING APPARATUS CAPABLE OF ADJUSTING THE AMPLITUDE OF A DIGITAL SIGNAL

(75) Inventor: Takeshi Sasaki, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/290,403

(22) Filed: Apr. 13, 1999

(30) Foreign Application Priority Data

Apr. 16, 1998 (JP) .......................................... P10-105961

(51) Int. Cl.⁷ ................................................ G11B 5/00
(52) U.S. Cl. ............................ 360/8; 360/32; 360/46; 369/3; 369/59.16; 704/500; 704/503
(58) Field of Search ............................ 369/59.1, 59.14, 369/59.15, 59.16, 59.21, 59.22, 59.23, 59.24, 3, 4, 83; 360/65, 31, 54, 53, 32, 46, 8, 13; 704/500, 503; 386/27, 33, 109, 112, 101; 341/50, 51, 61, 94

(56) References Cited

U.S. PATENT DOCUMENTS 4,559,568 A * 12/1985 Watanabe et al. ............. 360/54
5,701,124 A * 12/1997 Ichimura et al. .............. 341/50
5,822,370 A * 10/1998 Graupe ........................ 704/500
6,098,036 A *  8/2000 Zinser, Jr. et al. .......... 704/219

\* cited by examiner

Primary Examiner—Alan T. Faber
(74) Attorney, Agent, or Firm—Rader, Fishman & Grauer PLLC; Ronald P. Kananen

(57) ABSTRACT

The invention relates to a digital-signal processing apparatus for playing back a digital signal recorded on a recording medium, wherein the digital signal is recorded onto the recording medium by delimiting the digital signal at predetermined time intervals into blocks and then processing each of the blocks to convert the digital signal into at least first coefficient data prescribing the amplitude of the digital signal or first coefficient data prescribing the amplitude of a component obtained as a result of conversion of the digital signal and second coefficient data for prescribing the waveform of the digital signal in conjunction with the first coefficient data, and the digital-signal processing apparatus selectively updates the first coefficient data of the digital signal recorded on the recording medium.

10 Claims, 4 Drawing Sheets

DIGITAL-SIGNAL PROCESSING APPARATUS CAPABLE OF ADJUSTING THE AMPLITUDE OF A DIGITAL SIGNAL

BACKGROUND OF THE INVENTION

The present invention relates to a digital-signal processing apparatus and is applicable to equipment such as a mini-disc recording/playback apparatus. The present invention allows the amplitude of a digital signal recorded on a recording medium to be adjusted through simple processing carried out in a simple configuration to rewrite only first coefficient data prescribing the amplitude of the digital signal or first coefficient data prescribing the amplitude of a component obtained as a result of conversion of the digital signal.

Traditionally, in a mini-disc recording/playback apparatus, an audio signal is subjected to data compression adopting an ATRAC (Adaptive Transform Acoustic Coding) technique at predetermined time intervals prior to recording the compressed data onto a mini-disc adding further information including error-correction codes added to the data.

For the reason described above, in processing such as fade-in or fade-out carried out on the audio data recorded on the mini-disc, the mini-disc recording/playback apparatus reproduces encoded data from the mini-disc and decompresses the reproduced data to generate audio data. The reproduced audio data is further multiplied by a gain coefficient, subjected to data compression and again recorded onto the mini-disc.

In addition, in the case of adopting SCMS (serial copy management system), direct recording of audio data is controlled and restricted by an SCMS, the mini-disc recording/playback apparatus once converts decompressed audio data into an analog signal. Subsequently, the level of the analog signal is corrected before the analog signal is converted into a digital signal, or multiplied by a gain coefficient after being converted into the digital signal. Then, audio data obtained as a result of the multiplication is subjected to compression before being recorded onto the mini-disc.

In order to change the volume of audio data recorded on the mini-disc as described above, this sort of system requires a data-decompression circuit for decompressing audio data played back from the mini-disc and a data-compression circuit for compressing audio data with the volume thereof changed, raising a problem of a configuration becoming complicated accordingly. In order to solve this problem, there is a conceivable processing circuit with a high processing speed whereby the data compression and the data decompression can be carried out concurrently at the same time. In this case, however, there arises another problem of a complicated processing procedure of the processing circuit.

In either case, another mini-disc is required separately for recording the audio data with the volume thereof adjusted. In addition, it is also necessary to reproduce an entire song or data from the entire mini-disc even if the volume merely needs to be changed partially.

SUMMARY OF THE INVENTION

It is thus an object of the present invention addressing the problems described above to provide a digital-signal processing apparatus that is capable of adjusting the amplitude of a digital signal recorded on a recording medium by carrying out simple processing in a simple configuration.

In order to solve the problems described above, the present invention selectively updates first coefficient data prescribing the amplitude of a digital signal or first coefficient data prescribing the amplitude of a component obtained as a result of conversion of the digital signal, and second coefficient data prescribing the waveform in conjunction with the first coefficient data.

By selectively updating the first coefficient data prescribing the amplitude, the level of a digital signal can be changed without the need of decoding the digital signal. As a result, the level of the digital signal can be changed by carrying out simple processing in a simple configuration.

DETAILED DESCRIPTION OF THE INVENTION

Next, an embodiment of the present invention is explained in detail by appropriately referring to the accompanying diagrams.

Figure 2:
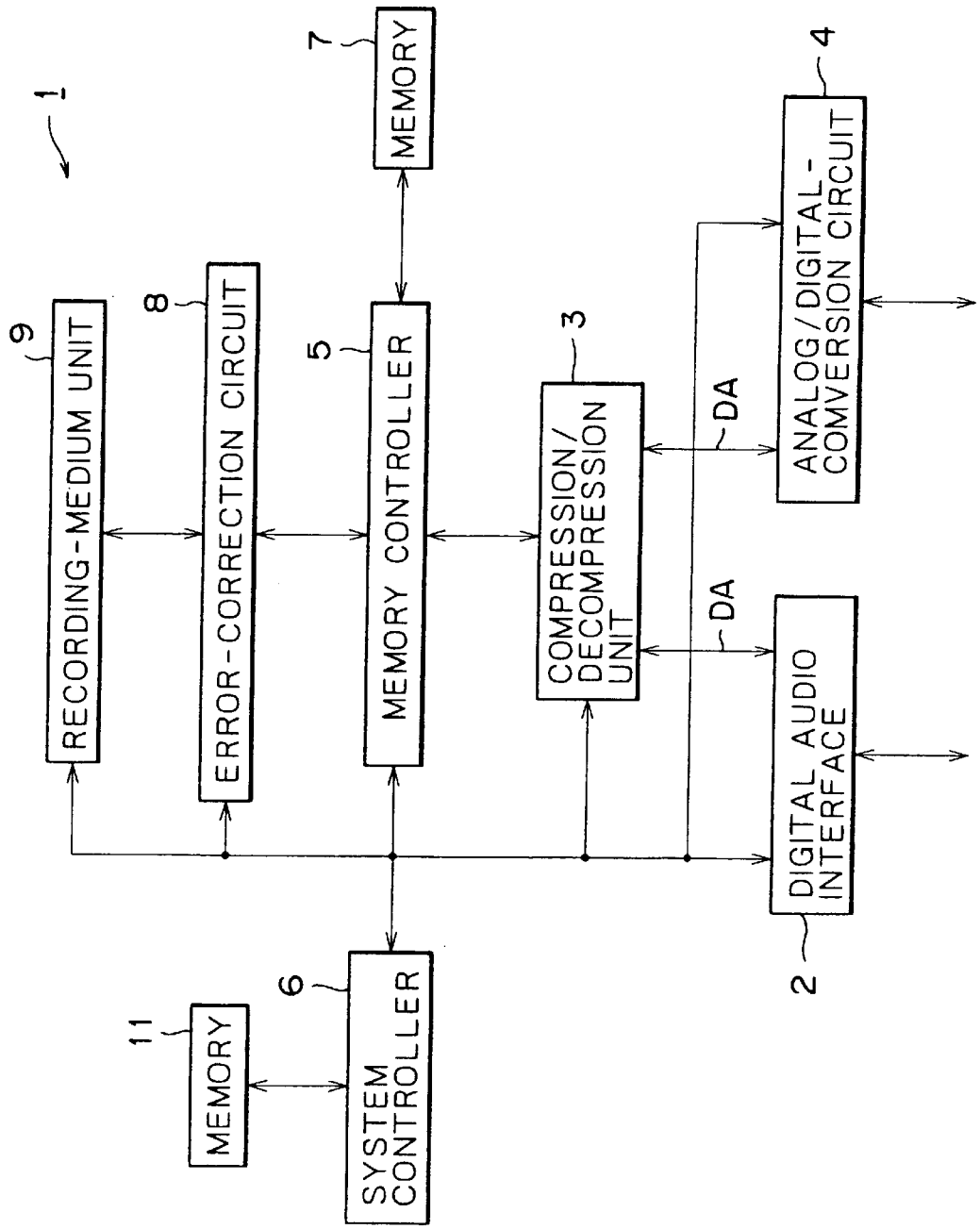
FIG. 2 is a block diagram showing a mini-disc recording/playback apparatus implemented by the embodiment of the present invention.

FIG. 2 is a block diagram showing a mini-disc recording/playback apparatus 1 implemented by the embodiment of the present invention. As shown in the figure, the mini-disc recording/playback apparatus 1 employs a digital audio interface 2 whereby a digital audio signal DA in a predetermined format is input from external equipment and supplied to a compression/decompression unit 3 and, on the contrary, a digital audio signal DA received from the compression/decompression unit 3 is output to the external equipment in the predetermined format.

Besides, an analog/digital-conversion circuit 4 converts an analog audio signal supplied thereto into a digital audio signal and outputs the digital audio signal DA to the compression/decompression unit 3. On the contrary, the analog/digital-conversion circuit 4 converts digital audio data DA received from the compression/decompression unit 3 into an analog signal that is then output as an audio signal.

In a recording operation, the compression/decompression unit 3 compresses digital audio signal DA, outputting the compressed digital audio signal to a memory controller 5. In a playback operation, on the other hand, the compression/decompression unit 3 decompresses compressed digital audio signal received from the memory controller 5, outputting a digital audio signal DA obtained as a result of the decompression.

Figure 3:
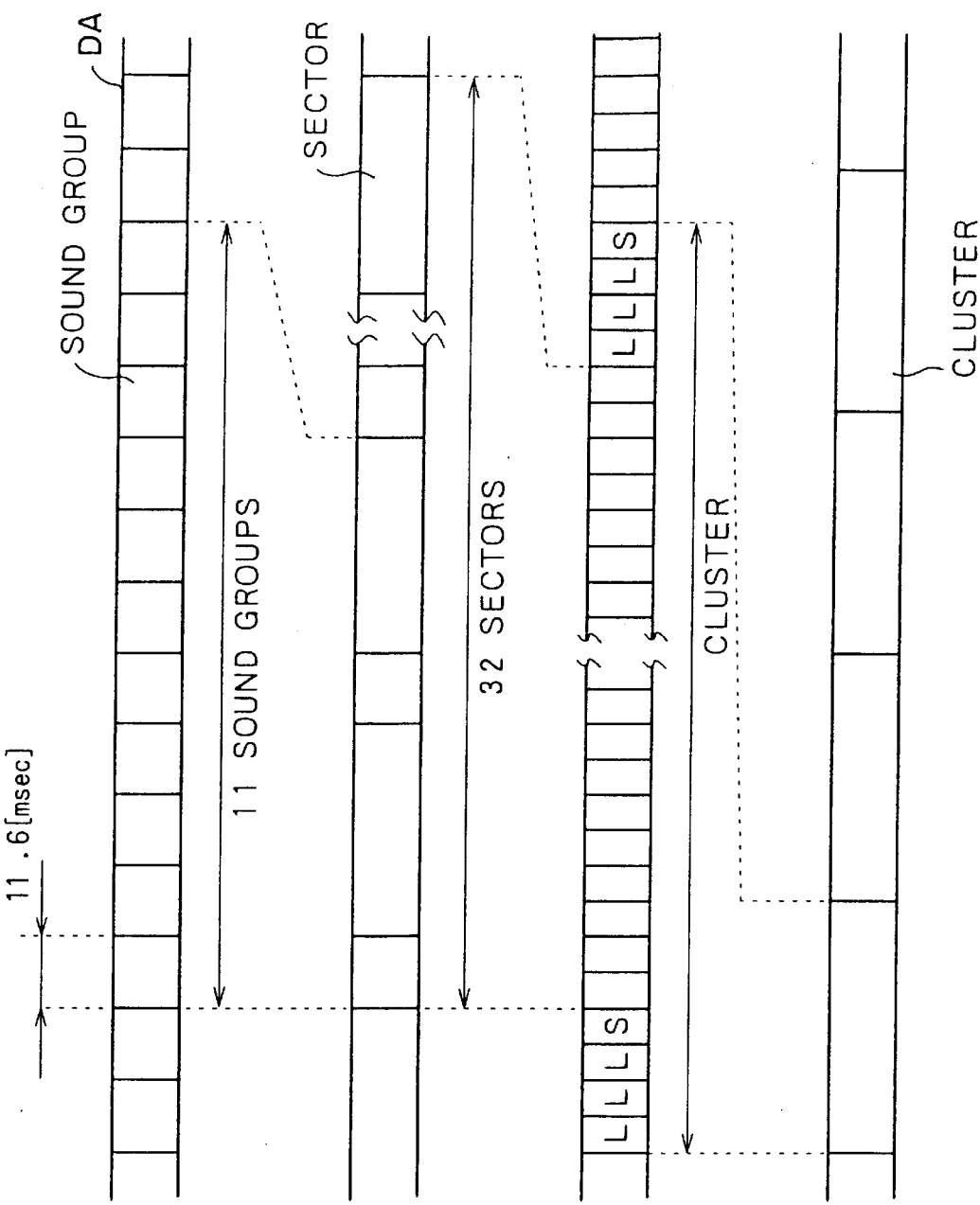
FIGS. 3A to 3D show time-charts used for explaining the operation of a compression/decompression unit employed in the mini-disc recording/playback apparatus shown in FIG. 2.

In detail, the compression/decompression unit 3 delimits a digital audio signal DA at time intervals of 11.61 [msec] as shown in FIG. 3 in a recording operation, forming blocks as shown in FIG. 3A. Then, after dividing the blocks into predetermined frequency bands, an MDCT (Modified Discrete Cosine Transform) is carried out for each of the frequency bands to split the digital audio signal DA into amplitude data prescribing the amplitude of each frequency spectrum and frequency-spectrum data normalized by the amplitude data. That is, the amplitude data is referred to hereafter as first coefficient data and the frequency-spectrum data is referred to hereafter as second coefficient data for prescribing the waveform of the digital audio signal in conjunction with the first coefficient data. It should be noted that the amplitude data is represented in a logarithmic expression.

The compression/decompression unit 3 expresses the spectrum data generated in this way with a length equal to a multiple of a predetermined word length. At that time, the compression/decompression unit 3 switches the assignment of a bit count to each frequency band for the spectrum data and the amplitude data created as described above by using an algorithm adapted to variations in signal level in each block. In this way, the compression/decompression unit 3 switches the data compression mode in accordance with the digital audio signal DA, compressing the data with a high degree of efficiency by effectively utilizing the sense of hearing of a human being.

Figure 4:
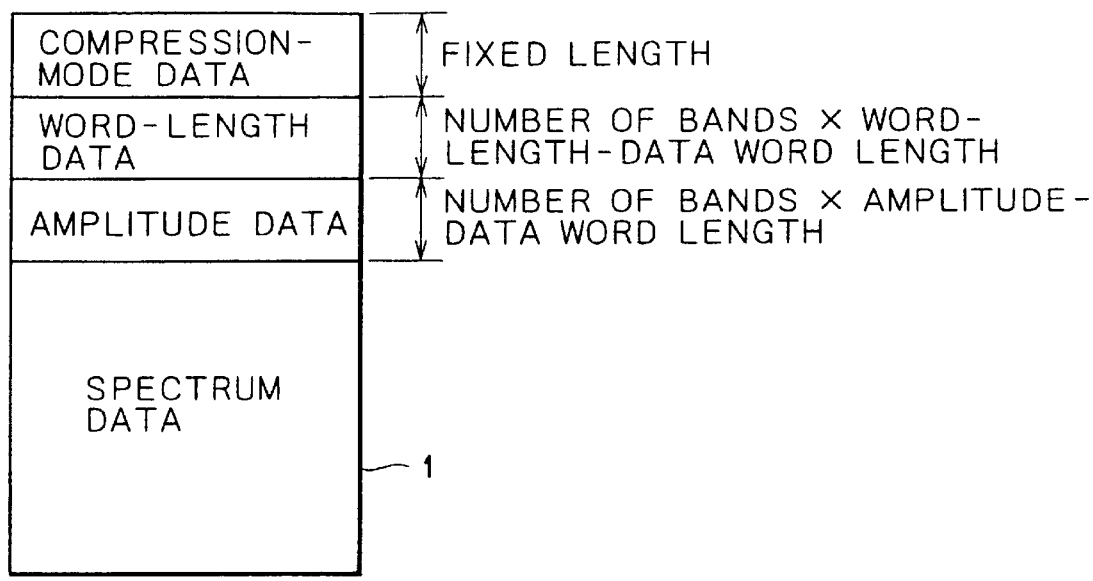
FIG. 4 is a diagram showing the data structure of a sound group shown in FIG. 3.

The compression/decompression unit 3 creates data of one sound group comprising compression-mode data with a fixed length showing the data compression mode, word-length data showing the word length of spectrum data assigned to each frequency band, the amplitude data of the frequency spectrum and the spectrum data as shown in FIG. 4. These pieces of data are referred to hereafter as compressed data.

The mini-disc recording/playback apparatus 1 forms one sector from eleven sound groups from right and left channels as shown in FIGS. 3A and 3B. Before and after 32 sectors, each comprising 11 sound groups, four connection sectors are provided as shown in FIG. 3C. The four connection sectors preceding the 32 sectors, the 32 sectors and the 4 connection sectors succeeding the 32 sectors constitute a cluster as shown in FIG. 3C. The mini-disc recording/playback apparatus 1 records an audio signal onto a mini-disc and plays back an audio signal recorded on a mini-disc in cluster units as shown in FIG. 3D.

The compression/decompression unit 3 outputs the data of the sound group created in this way to the memory controller 5 as compressed data.

In a playback operation, on the other hand, the compression/decompression unit 3 receives compressed data from the memory controller 5 in sound-group units, decompressing the data in inverse processing opposite to the recording operation.

In an edit operation, the compression/decompression unit 3 receives compressed data from the memory controller 5 in sound-group units, adding or subtracting a fixed value to or from amplitude data appended to the compressed data under control executed by a system controller 6. In this way, the compression/decompression unit 3 changes the volume of the digital audio signal DA for each sound group. The compressed data with the amplitude data thereof changed as described above is returned to the memory controller 5.

In a recording operation, the memory controller 5 temporarily stores compressed data received from the compression/decompression unit 3 in sound-group units into a memory 7 before reading out the compressed data back from the memory 7 and then outputting it to an error-correction circuit 8. In a playback operation, on the contrary, the memory controller 5 stores compressed data received from the error-correction circuit 8 into the memory 7 temporarily before reading out the compressed data back from the memory 7 in sound-group units for outputting it to the compression/decompression unit 3.

In an edit operation, the memory controller 5 receives compressed data from the error-correction circuit 8, holding the compressed data in the memory 7. Then, the memory controller 5 reads out the compressed data back from the memory 7 in sound-group units, outputting the data to the compression/decompression unit 3. Subsequently, compressed data with the amplitude data thereof changed by the compression/decompression unit 3 is stored in the memory 7 for outputting it to the error-correction circuit 8. The memory controller 5 carries out this series of pieces of processing repeatedly in a cluster unit.

In a recording operation, the error-correction circuit 8 adds error-correction codes to compressed data output by the memory controller 5. The error-correction circuit 8 carries out interleave processing on the compressed data by inputting and outputting the data through the memory controller 5 for outputting the data completing the interleave processing. In a playback operation, on the contrary, the error-correction circuit 8 receives compressed data played back by a recording-medium unit 9, carrying out error correction and deinterleave processing on the data before outputting its results to the memory controller 5. In an edit operation, the error-correction circuit 8 carries out series of pieces of processing of the playback and recording operations repeatedly in a cluster unit.

The recording-medium unit 9 comprises, among other components, a driving mechanism for driving a mini-disc and a recording/playback mechanism for recording desired data by sequentially forming marks on the mini-disc and for playing back data recorded on the mini-disc. In a recording operation, the recording-medium unit 9 adds data such as sub-codes to data output by the error-correction circuit 8 prior to modulation by adoption of a predetermined modulation technique. Then, the recording-medium unit 9 forms marks sequentially on the mini-disc in accordance with a recording signal obtained as a result of the modulation. In this way, the recording-medium unit 9 records a digital audio signal DA on the mini-disc.

In a playback operation, on the contrary, a playback signal is obtained from a reflected light resulting from radiation of a laser beam to the mini-disc. The playback signal is then processed to generate playback data. Then, the playback data is demodulated and output to the error-correction circuit 8. In this way, a digital audio signal recorded on the mini-disc can be played back. In an edit operation, a desired cluster is played back under control executed by the system controller 6 and compressed data obtained as a result of this playback operation is output to the error-correction circuit 8. Compressed data input from the error-correction circuit 8 is recorded in an area specified by the system controller 6, overwriting data already recorded in the area.

The system controller 6 is implemented by a microcomputer for controlling the operation of all the mini-disc recording/playback apparatus 1 as a whole through execution of a series of processing procedures by securing a work area in a memory unit 11.

To put it in detail, when the user selects a recording-operation mode by operating a predetermined operating unit, the operations of the compression/decompression unit 3, the memory controller 5, the error correction circuit 8 and the recording-medium unit 9 are switched to the recording-operation mode to record a digital audio signal DA input from the digital audio interface 2 or the analog/digital-conversion circuit 4 onto the mini-disc. When the user selects a playback-operation mode by operating a predetermined operating unit, on the other hand, the operations of the compression/decompression unit 3 and other components are switched to the playback-operation mode to play back a digital audio signal DA from the mini-disc and output the playback signal.

Figure 1:
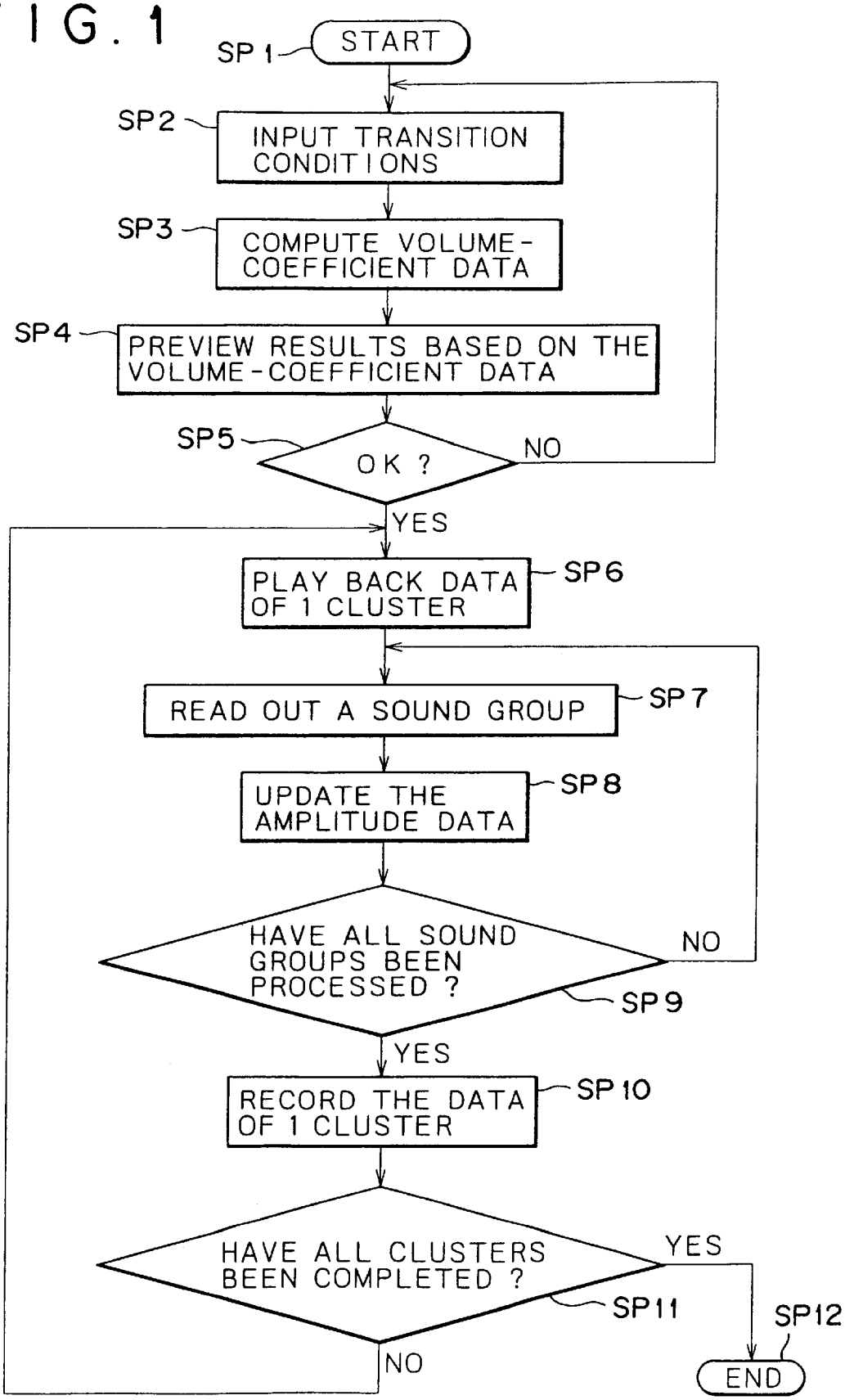
FIG. 1 shows a flowchart used for explaining the operation of a system controller employed in an audio system provided by an embodiment of the present invention.
Figure 5:
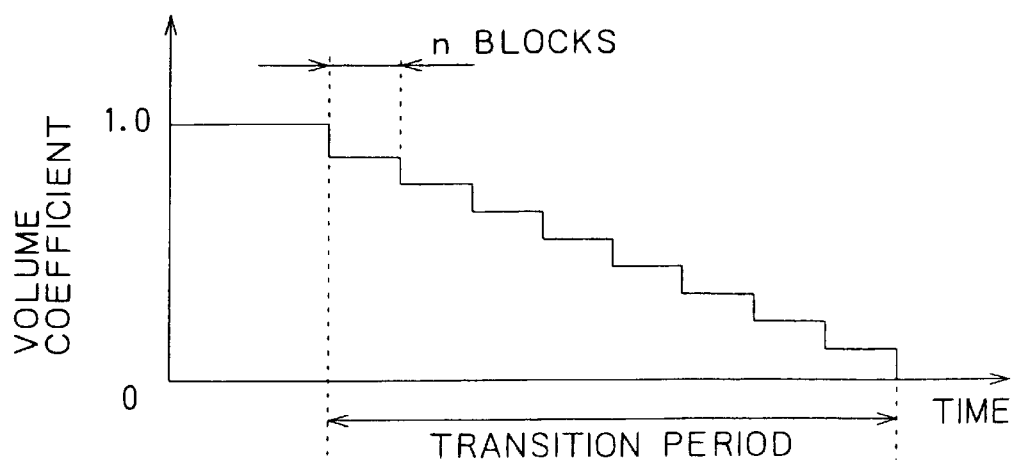
FIG. 5 shows time-charts used for explaining how a volume coefficient is set in fade-out processing.

When the user selects an edit-operation mode by operating a predetermined operating unit, the processing procedure shown in FIG. 1 is executed. As a result, the volume of a digital audio signal recorded on the mini-disc is changed. It should be noted that, while what are shown in FIGS. 1 and 5 explain only fade-out processing in which the volume is reduced gradually, fade-in processing for gradually increasing the volume is carried out in the same way as the fade-out processing.

When the user selects an edit-operation mode, the flow of the processing procedure goes on from a step SP1 of the flowchart shown in FIG. 1 to a step SP2 at which the system controller 6 inputs transition conditions. The transition conditions are conditions for changing the volume of an audio signal recorded on the mini-disc. The conditions include a mode for changing the volume, an in-point for starting the changing of the volume, an out-point for ending the changing of the volume and a period of time for changing the volume.

The flow of the processing procedure then proceeds to a step SP3 at which the system controller 6 computes a volume coefficient for changing the volume according to the conditions input at the step SP2. In this embodiment, the amplitude data is represented in a logarithmic expression. Thus, in order to change the volume as in the case of fade-out processing shown in FIG. 5, the system controller 6 computes a volume coefficient to be subtracted from the amplitude data so as to gradually reduce the volume in a form selected by the user for a transition period and stores the computed coefficient data in the memory unit 11.

Subsequently, the flow of the processing procedure goes on to a step SP4 at which the system controller 6 carries out preview processing. Here, the system controller 6 controls all operations to play back an audio signal recorded on the mini-disc during a period of time including the transition period thereof. During this playback transition period, the system controller 6 outputs the coefficient data stored in the memory unit 11 to the compression/decompression unit 3 and controls the operation of the compression/decompression unit 3 to add or subtract the coefficient data to or from the amplitude data added to the compressed data of each sound group and decompress the audio data.

Then, the flow of the processing procedure continues to a step SP5 at which the system controller 6 forms a judgment as to whether or not a predetermined operating unit has been operated by the user to indicate that the user is satisfied with the preview result. If the outcome of the judgment is a denial, the flow of the processing procedure goes back to the step SP2 at which new conditions are input.

If the outcome of the judgment formed at the step SP5 is an acknowledgment, on the other hand, the flow of the processing procedure goes on to a step SP6 at which the system controller 6 plays back one cluster in the transition period from the mini-disc and stores the reproduced compressed data in the memory 7. Then, the flow of the processing procedure proceeds to a step SP7 at which the system controller 6 reads out the compressed data of the sound group by one sound group from the memory 7 and outputs the data to the compression/decompression unit 3. Subsequently, the flow of the processing procedure continues to a step SP8 at which the system controller 6 outputs the corresponding coefficient data stored in the memory unit 11 to the compression/decompression unit 3. The coefficient data is used for updating the amplitude data of the compressed data of the sound group supplied to the compression/decompression unit 3. To be more specific, the coefficient data is subtracted from the amplitude data.

The system controller 6 further updates contents of the memory 7 by using the compressed data with the amplitude data thereof updated in this way. The flow of the processing procedure then goes on to a step SP9 at which the system controller 6 forms a judgment as to whether or not the processing to update amplitude data has been carried out for all sound groups read out from the memory 7. If the outcome of the judgment is a denial, the flow of the processing procedure goes back to the step SP7. In this way, the system controller 6 sequentially repeats the series of pieces of processing of the steps SP7, SP8 and SP9 of the procedure for a cluster read out from the memory 7. As the amplitude data of one cluster is all updated, the outcome of the judgment formed at the step SP9 turns into an acknowledgment. Then, the flow of the processing procedure goes on to a step SP10.

At the step SP10, the system controller 6 transfers the compressed data of one cluster stored in the memory 7 to the original recording area on the mini-disc for overwriting the area. Then, the flow of the processing procedure proceeds to a step SP11 at which the system controller 6 forms a judgment as to whether or not the amplitude data of all clusters in the transition period has been updated. If the outcome of the judgment is a denial, the flow of the processing procedure goes back to the step SP6 at which the processing for the next cluster is started. In this way, the system controller 6 repeatedly carries out the pieces of processing of the steps SP6, SP7, SP8, SP9, SP10, SP11 and SP6 of the procedure for amplitude data of all clusters in the transition period. As the amplitude data of all the clusters in the transition period is updated, the outcome of the judgment formed at the step SP11 turns into an acknowledgment. In this case, the flow of the processing procedure goes on to a step SP12 at which the processing procedure is ended.

In the configuration described above, a digital audio signal DA as shown in FIGS. 2 and 3 input from the digital audio interface 2 or the analog/digital-conversion circuit 4 in a recording operation is delimited at predetermined time intervals by the compression/decompression unit 3 into blocks. Each block is then subjected to data processing to convert the digital audio signal into amplitude data prescribing the amplitude of each frequency spectrum and second coefficient data prescribing the waveform of the digital audio signal in conjunction with the amplitude data. The amplitude data is also referred to as first coefficient data.

The first coefficient data and the second coefficient data of the digital audio signal DA are divided into sound groups each having a predetermined bit length as shown in FIG. 4. Sound groups constitute a sector and sectors constitute a cluster. The digital audio signal is recorded into a mini-disc in cluster units.

In a playback operation, on the contrary, pieces of compressed data of the digital audio signal DA sequentially played back from the mini-disc are converted by the compression/decompression unit 3 into the original format and output as a playback signal to external equipment.

In an edit operation, the system controller 6 receives conditions for changing the volume as desired by the user as shown in the flowchart of FIG. 1, creating volume-coefficient data for correcting amplitude data in accordance with the conditions input thereto. The amplitude data is then sequentially corrected by the volume-coefficient data to reproduce the digital audio signal DA used for carrying out preview processing.

If the preview processing confirms the conditions, compressed data is played back from the mini-disc in cluster units and the amplitude data of the compressed data is sequentially updated one sound cluster after another before being recorded back into the original recording areas. Thus, in the digital audio signal rerecorded at the original recording area, the amplitude of each frequency component demodulated by spectrum data is set at a value of the amplitude data updated as described above. As a result, the digital audio signal is demodulated into a playback signal, the volume of which has been adjusted by carrying out processing to merely update the amplitude data thereof.

In the configuration described above, a digital audio signal is delimited at predetermined time intervals into blocks. Each block is then subjected to data processing to convert the digital audio signal into first coefficient data prescribing the amplitude of each frequency spectrum and second coefficient data prescribing the waveform of the digital audio signal in conjunction with the first coefficient data before the digital audio signal is recorded onto a mini-disc. As a result, the volume of the digital audio signal can be adjusted by carrying out simple processing in a simple configuration wherein the operation of the compression/decompression unit 3 of a single system is switched to update first coefficient data of compressed data of the digital audio signal.

In addition, the volume can be adjusted without the need to prepare another recording medium. Moreover, by recording back a digital audio signal completing volume adjustment onto the same recording medium, the volume can be updated without the need to carry out analog-to-digital conversion and digital-to-analog conversion even in the case of recording of the digital audio signal controlled by the SCMS.

On the top of that, since the volume is updated in cluster units, the processing can be carried out by using a memory 7 having a small size.

In the embodiment described above, the volume is updated for each cluster. It should be noted, however, that the scope of the present invention is not limited by such an embodiment. If the memory 7 has a sufficiently large size, for example, the volume can also be updated with a plurality of clusters taken as a unit.

In addition, in the embodiment described above, the volume is updated by the compression/decompression unit 3. It should be noted, however, that the scope of the present invention is not limited by such an embodiment. For example, the volume can also be updated by the system controller 6.

Moreover, the embodiment described includes processing wherein amplitude data is changed by the compression/decompression unit 3 even during a preview. It should be noted, however, that the scope of the present invention is not limited by such an embodiment. For example, it is also possible to carry out processing wherein decompressed audio data is multiplied by a volume coefficient during a preview.

Furthermore, in the embodiment described above, the volume is changed under a condition set by the system controller 6 for a fade-out operation or the like. It should be noted, however, that the scope of the present invention is not limited by such an embodiment. For example, the present invention can also be applied to a wide range of fields such as increasing or decreasing the volume of an entire song not to mention the fade-in processing.

In addition, in the embodiment described above, the present invention is applied to a mini-disc recording/playback apparatus. It should be noted, however, that the scope of the present invention is not limited by such an embodiment. For example, the present invention can also be widely applied to a case in which an audio signal is recorded onto a magnetic tape.

Moreover, in the embodiment described above, the present invention is applied to processing of a digital audio signal in which amplitude data is changed. It should be noted, however, that the scope of the present invention is not limited by such an embodiment. For example, the present invention can also be widely applied to a case of processing a video signal which is obtained as a result of data compression by adopting an MPEG technique and recorded on a desired recording medium. In addition, the present invention can also be applied to a case of updating coefficient data of a quantization table for quantizing results of discrete cosine transform processing. On the top of that, the present invention can also be widely applied to a case of processing a digital signal recorded on a recording medium, by making use of the digital signal comprising first coefficient data prescribing the amplitude of the digital signal or first coefficient data prescribing the amplitude of a component obtained as a result of conversion of the digital signal and second coefficient data for prescribing the waveform of the digital signal in conjunction with the first coefficient data.

As described above, according to the present invention, the amplitude of a digital signal recorded on a recording medium can be adjusted through simple processing carried out in a simple configuration to rewrite only first coefficient data prescribing the amplitude of the digital signal or first coefficient data prescribing the amplitude of a component obtained as a result of conversion of the digital signal.

What is claimed is:

1. A digital-signal processing apparatus for playing back a digital signal recorded on a recording medium, wherein:

said digital signal is recorded onto said recording medium by delimiting said digital signal at predetermined time intervals into blocks and then processing each of said blocks to convert said digital signal into at least first coefficient data prescribing the amplitude of said digital signal or first coefficient data prescribing the amplitude of a component obtained as a result of conversion of said digital signal and second coefficient data for prescribing the waveform of said digital signal in conjunction with said first coefficient data; and said digital-signal processing apparatus selectively updates said first coefficient data of said digital signal recorded on said recording medium.

2. A digital-signal processing apparatus according to claim 1, wherein:

said digital signal is recorded onto said recording medium after error-correction codes added thereto in such a way that a plurality of said blocks are used as an error-correction processing unit; and said digital-signal processing apparatus plays back said digital signal recorded on said recording medium in said error-correction processing units, updates said first coefficient data of said digital signal being played back from said recording medium and records said digital signal with said first coefficient data thereof updated back onto said recording medium.

3. A digital-signal processing apparatus according to claim 1, wherein said digital signal is an audio signal.

4. A digital-signal processing apparatus according to claim 3, wherein said first coefficient data is updated so that a volume of said audio signal gradually decreases with the lapse of time.

5. A digital-signal processing apparatus according to claim 3, wherein said first coefficient data is updated so that a volume of said audio signal gradually increases with the lapse of time.

6. A digital-signal processing apparatus comprising:

a compression/decompression unit, said compression/decompression unit producing frequency-spectrum data and amplitude data from a digital audio signal, said frequency-spectrum data being assigned to a frequency band and prescribing the waveform of said digital audio signal, and said amplitude data prescribing the amplitude of said frequency-spectrum data, wherein said compression/decompression unit compresses said digital audio signal to produce a compressed digital audio signal, wherein said compression/decompression unit compresses said digital audio signal to produce a compressed digital audio signal when said digital-signal processing apparatus is in a recording mode.

7. A digital-signal processing apparatus comprising:

a compression/decompression unit, said compression/decompression unit producing frequency-spectrum data and amplitude data from a digital audio signal, said frequency-spectrum data being assigned to a frequency band and prescribing the waveform of said digital audio signal, and said amplitude data prescribing the amplitude of said frequency-spectrum data, wherein said compression/decompression unit compresses said digital audio signal to produce a compressed digital audio signal, wherein said amplitude data is represented in a logarithmic expression.

8. A digital-signal processing apparatus according to claim 7, wherein said compression/decompression unit compresses said digital audio signal to produce a compressed digital audio signal.

9. A digital-signal processing apparatus according to claim 8, wherein said compression/decompression unit compresses said digital audio signal to produce a compressed digital audio signal when said digital-signal processing apparatus is in a recording mode.

10. A digital-signal processing apparatus comprising:

a compression/decompression unit, wherein said compression/decompression unit produces compressed data, said compressed data being data of one sound group, said compressed data including:

spectrum data, said spectrum data being assigned to each frequency band;

amplitude data, said amplitude data providing the amplitude of said spectrum data;

compression-mode data, said compression-mode data having a fixed length providing the data compression mode for said spectrum data; and word-length data, said word-length data showing the word length of said spectrum data.

* * * * *